3,438,313
AUTOMATIC EXPOSURE CONTROL FOR
PHOTOFLASH EXPOSURES
Jeremy M. Topaz, Rehovoth, Israel, assignor to Polaroid
Corporation, Cambridge, Mass., a corporation of Delaware
Filed Mar. 4, 1966, Ser. No. 531,870
Int. Cl. G01j 1/52
U.S. Cl. 95—10          14 Claims

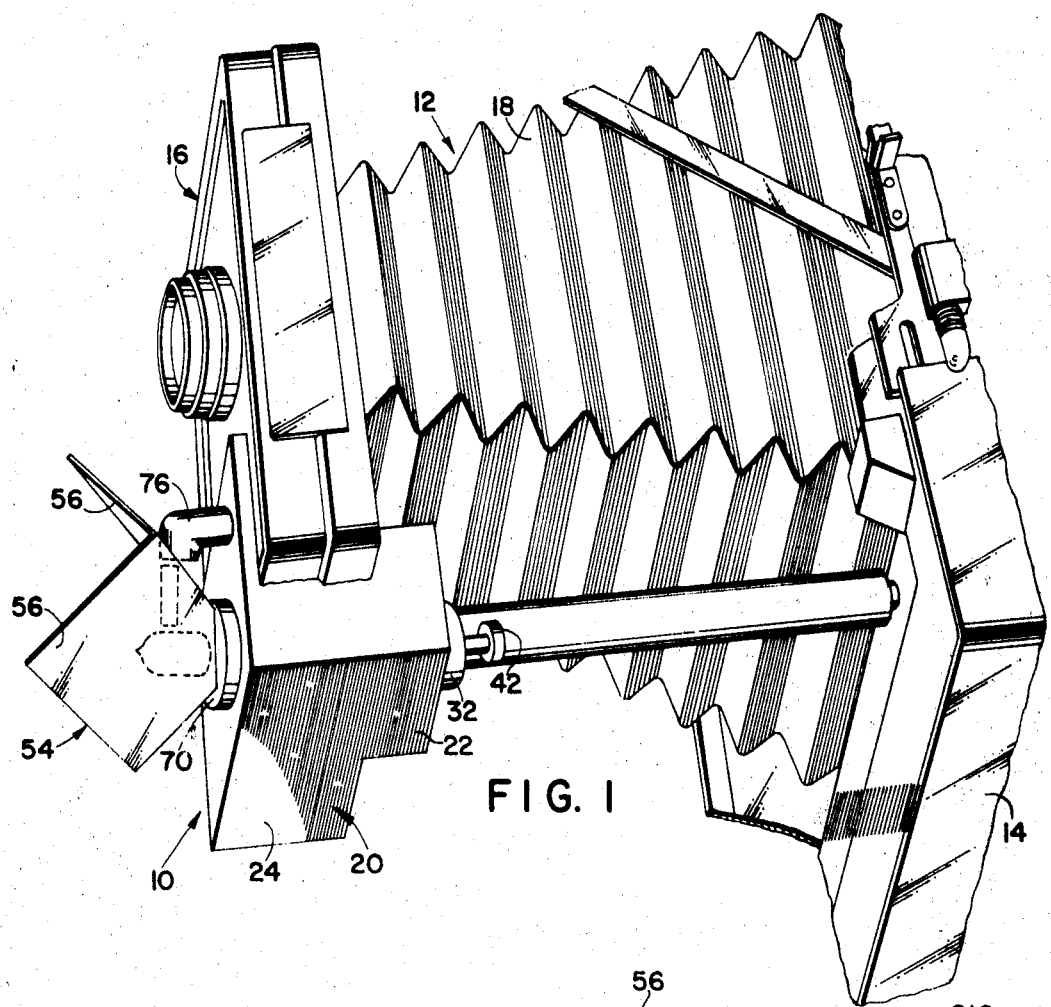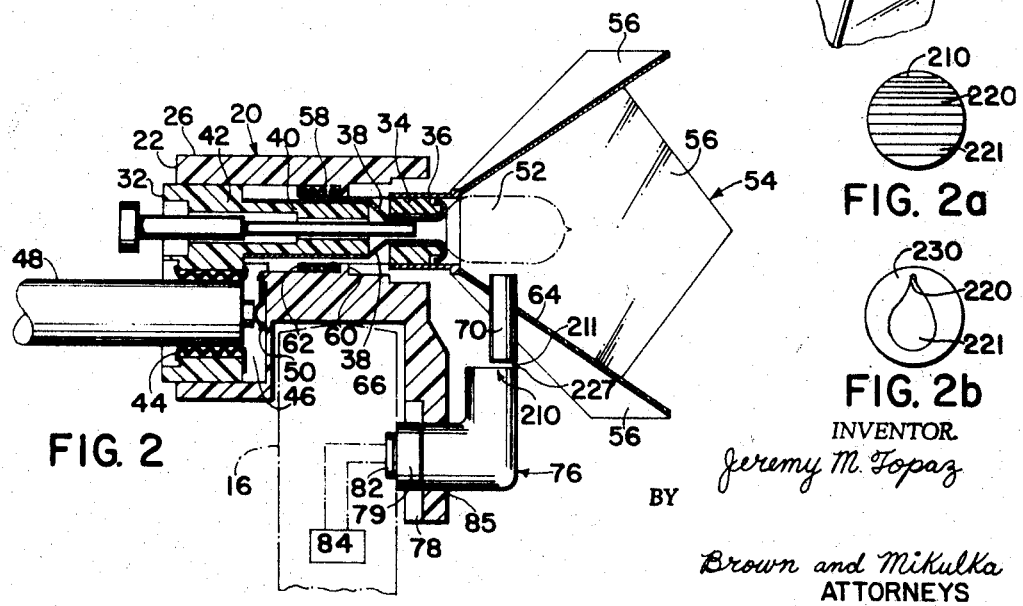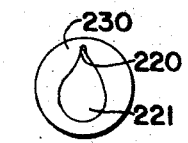

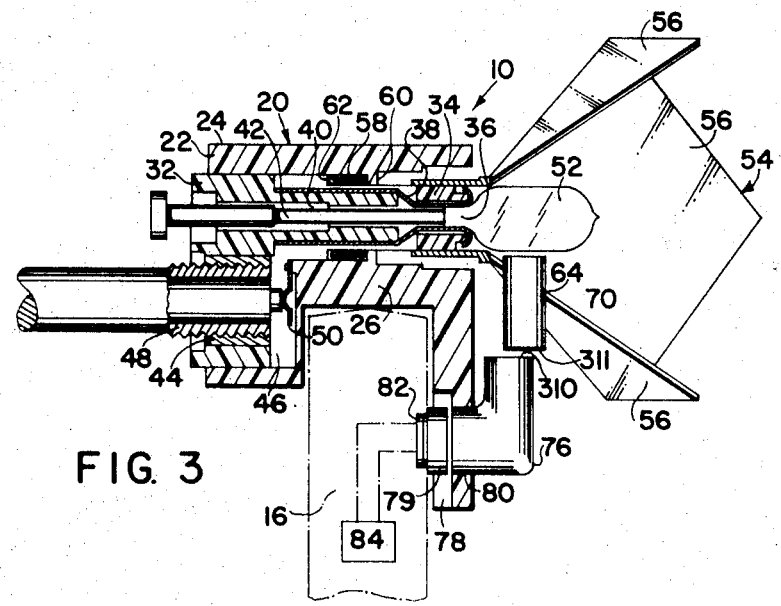

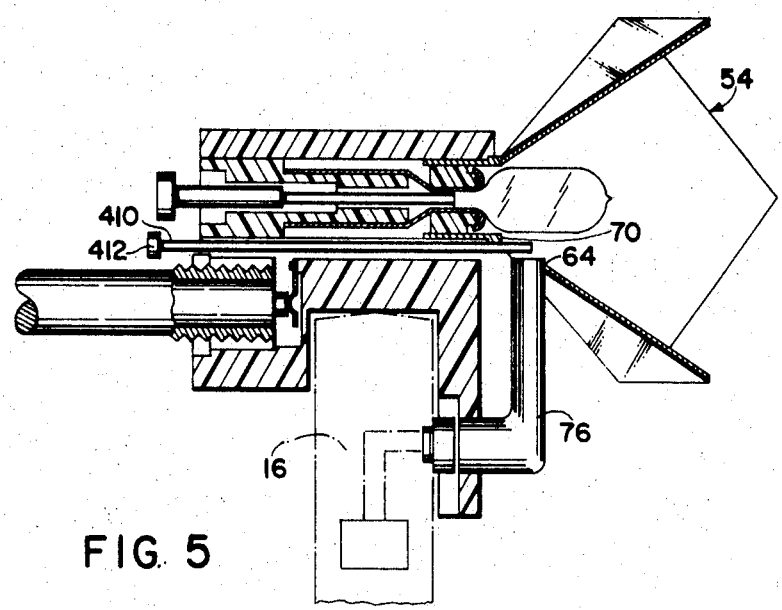
FIG. 5
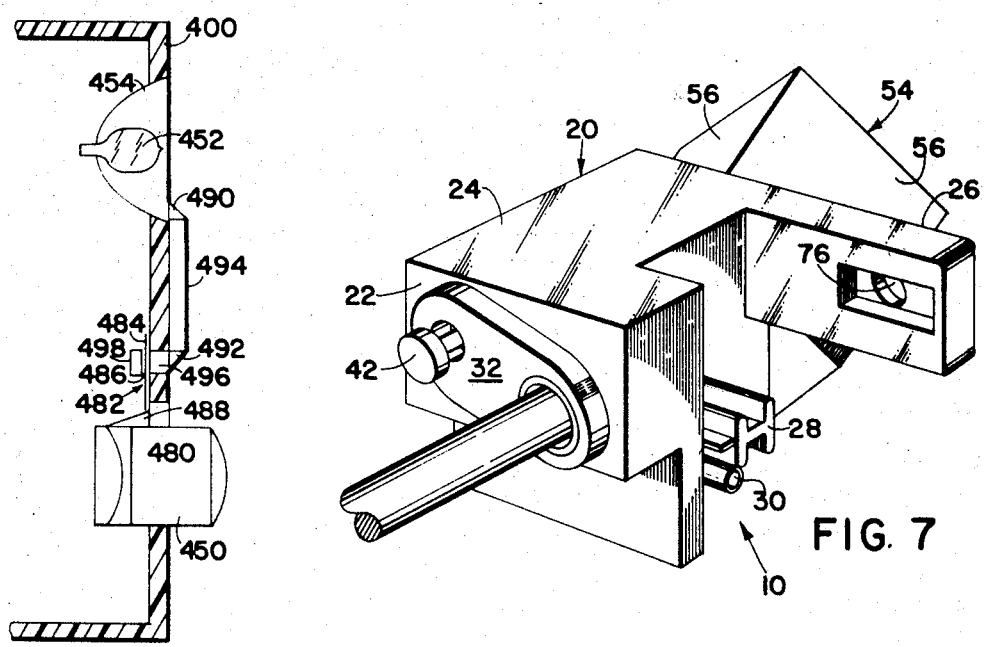
FIG. 6
FIG. 7
INVENTOR.
Jeremy M. Topaz
BY
Brown and Mikulka
ATTORNEYS United States Patent Office 3,438,313
Patented Apr. 15, 1969

ABSTRACT OF THE DISCLOSURE

A photoflash mechanism which utilizes light which has not been reflected by the scene. A path is provided for shining a portion of the flash directly onto the photocell.

---

This invention relates to photoflash apparatus for use with a camera having an automatic exposure control device, and more particularly to improved apparatus of this type for reducing or eliminating errors previously associated with automatically controlled exposures of scenes illuminated by photoflash apparatus.

Many suitable devices for controlling one or more exposure parameters automatically as a function of scene brightness have previously been proposed and introduced into commercial use. For example, the exposure control device disclosed in U.S. Patent No. 3,205,804 of J. M. Topaz includes an electronic switching circuit which is triggered in response to the charge on a timing capacitor reaching a predetermined level. The current supply to a solenoid which controls movement of a shutter blade, and thereby the time of exposure, is switched off when the circuit triggers. The rate of change of the charge on the capacitor is controlled by the resistance of a photoconductor connected in series with the timing capacitor and arranged to receive light from the scene being photographed.

Devices of the type described above have proven generally satisfactory for controlling exposures of scenes illuminated by light of substantially constant intensity. However, certain errors are associated with exposures of scenes illuminated by light of rapidly changing intensity, such as photoflash exposures. The nature of such errors, as well as compensating means designed to reduce the magnitude thereof, are set forth in detail in the aforementioned U.S. Patent 2,205,804 and Patent No. 3,200,723. The magnitude of the error which arises in photoflash illuminated exposures is a function of the magnitude and rate of change in intensity of light striking the photoconductor, which in turn is a function of camera-to-subject distance in the usual situation where the photoflash unit is mounted on the camera and the photoconductor is arranged to receive light from the scene being photographed. The compensating means disclosed in the aforementioned U.S. patents, however, provide fixed degrees of compensation whenever they are placed in operation, thus providing complete compensation (i.e., optimum exposure) at only one camera-to-subject distance; at other distances the compensation is only approximate and under some conditions the exposure error may be significant when such compensating means are operative.

The present invention provides apparatus for use in conjunction with automatic exposure control devices of the type mentioned above and is designed to afford more effective compensation for features of the device which give rise to errors in exposures illuminated by photoflash apparatus. Rather than exposing the photoconductor to light reflected from the scene photographed, and controlling exposure in accordance therewith, the present invention contemplates directing a portion of the light output of the flashlamp directly onto the photocell. The latter is masked from all light other than that emanating from the flashbulb, whereby the exposure is controlled solely as a function of the intensity of such light. Suitable light path means are provided for directing the light from the flashbulb to the photocell, and further means are provided for variably attenuating the intensity of such light as a function of camera-to-subject distance. By properly relating the amount of attenuation to the camera-to-subject distance, a more effective compensation will be provided, thus affording optimum exposure over the full range of the flash apparatus for scenes of average brightness or reflectivity.

It is a primary object of this invention to provide means for controlling automatically the exposure duration of a photographic exposure control device to secure optimum exposure for flash-illuminated subjects of average brightness throughout the entire distance range within which the flash equipment is designed to operate.

An additional object is to provide means to control photographic exposure duration as a function of the direct light emitted by the photoflash unit, and the distance from the camera to the scene being photographed, rather than as a function of the light reflected from the scene.

Another object is to provide means adapted to pipe light from a photoflash unit to a photoresponsive element in an exposure control circuit to terminate exposure automatically in response to a predetermined amount of light impinging on said element.

A further object is to provide means to attenuate in a variable, predetermined manner light piped from a photoflash unit to a photoresponsive element in an exposure control circuit for the purpose of providing proper flash exposures automatically.

It is also an object of this invention to provide means to position, in response to focusing movement of a camera, light attenuating means interposed in the path of light from a photoflash unit to a photoresponsive element in the camera exposure control circuit.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 illustrates in perspective a first embodiment of the photoflash unit of this invention attached to a camera;

FIG. 2 is a cross section of the embodiment of the photoflash unit shown in FIGURE 1;

FIGS. 2a and 2b are plan views of two alternate embodiments of light attenuating means associated with the apparatus of FIG. 2;

FIG. 3 is a sectional view, as in FIG. 2, of a second embodiment of the invention;

FIGS. 4 and 5 show still further embodiments of the invention;

FIG. 6 is a diagrammatic showing of the invention in another embodiment; and

FIG. 7 is a perspective view of the embodiment shown in FIG. 2.

Reference is now made to the drawings which show flash apparatus in the form of a flashgun embodying elements of the present invention and designated generally by the reference numeral 10. Flashgun 10 is adapted to be mounted on and coupled with a camera 12 of the type comprising a main body section 14, in which the photographic film is supported during exposure, and a section comprising a lens and shutter housing 16 movable relative to body section 14 for focusing the lens in accordance with camera-to-subject distance. The camera includes the necessary means, such as bellows 18, for coupling the lens and shutter assembly to the main body, and an erecting system or linkage for supporting and moving the lens and shutter assembly relative to the main body portion. The flashgun is shown for illustrative purposes as being adapted for use with a self-developing camera having a shutter of the type shown and described in the aforementioned U.S. patents. Although it will be readily apparent that the invention may be used in combination with a wide variety of cameras, it is to be understood that the exposure control means are of the "automatic" type, including a photoresponsive element which, in the illustrated embodiment, may conveniently be mounted in housing 16.

Flashgun 10 comprises a housing 20 for mounting and enclosing components of the flashgun and coupling the flashgun with the lens and shutter assembly of the camera. Housing 20 may be of a generally rectangular configuration and includes a rear section 22, a side section 24 and a forward or cover section 26 cooperating to define a channel in which a portion of lens and shutter housing 16 is engaged, with cover section 26 extending across a portion of the front of housing 16 and covering the photoresponsive element of the exposure control circuit, thus shielding the element against illumination by light from the subject. Rear section 22 is disposed behind a portion of housing 16 so that the latter is gripped between the rear and forward sections preventing relative movement of the housing 16 and housing 20 of the flashgun. The shutter housing includes an outlet or jack in a side wall thereof for receiving a plug including two projections 28 and 30 extending from side section 24 of the flashgun and adapted to enter the jack to couple the electrical circuit of the flashgun, including a flashlamp, to the flash synchronizing contacts of the shutter mechanism. Projections 28 and 30 are similar to those described in copending application Ser. No. 268,998 and are adapted to retain the flashgun in operatively coupled relation on the shutter assembly.

Mounted within rear section 22 and side section 24 of the flashgun housing is a support member 32 on which is mounted a flashlamp holder 36 and reflector 54 and means 48 including a battery for moving support member 32 relative to the flashlamp housing and the lens and shutter assembly. The flashlamp holder includes an axially recessed and slotted socket member 34 formed with a socket 36 shaped to receive the base of a photoflash lamp 52, and two electrically conducting strips 38 secured in axial recesses in the outside of socket member 34 and extending into and axially within socket 36 to make electrical contact with the contacts of a flashlamp. The lamp holder shown in the drawings is designed to be used with AG-1 type flashlamps having a relatively short, narrow glass base with two wires protruding therefrom and an elongated and generally cylindrical envelope containing the flash-producing material. The material comprising socket member 34 as well as that comprising support member 32, of which the socket member may be an integral portion, is nonconductive and preferably an organic plastic adapted to formation by conventional casting or molding processes; and conducting strips 38 are preferably formed of metal and include U-shaped ends which extend beyond the forward open end of socket 36 and are engaged in recesses in the end of the socket member adjacent the socket. Support member 32 and socket member 34 are formed with an axial bore 40 in which a manually engageable rod 42 is disposed extending into recess 36 for ejecting a flashlamp from the socket.

As a means for powering the flashlamp and also positioning the flashlamp with respect to main body section 14 of the camera, a conductive (metal) threaded shell or socket 44 is mounted in a recess 46 in the rear of flashgun housing 20 for receiving the threaded end of a tube 48 which may either constitute the outer casing of a battery or may contain a battery for firing a flashlamp mounted in socket 36. Socket 44 is connected directly to one of conducting strips 38, and a conductive contact 50 is provided in recess 46 for making the second electrical contact with the battery and is electrically coupled with the other conducting strip 38.

Support member 32 of FIGS. 2 and 3, together with reflector 54 and lamp socket 36, is mounted within housing 20 for movement forwardly and rearwardly along the coincident axes of the reflector and flashlamp socket and is biased rearwardly toward the main body section of the camera by means of coil spring 58 engaged around socket member 34 and between shoulder 60 on housing 20 and shoulder 62 on member 34. Support member 32 is retained against movement relative to the camera body 14 by means of tube 48 which extends rearwardly from the member 32 and abuts against the camera body.

A similar construction is used in the modification shown in FIG. 4 wherein parts identical to those in prior described embodiments are indicated by the same numbers which identify those parts in other views. Member 132 is held stationary with respect to the camera body and rearwardly biased by means of spring 158 disposed between surface 160 of member 132 and surface 162 of housing 120. Uniform light distribution from flashlamp 52 is achieved by use of a generally concave reflector 54 which is provided with an opening near the apex thereof for the flashbulb and an opening 64 in one side portion 56 to accommodate means to pass a quantity of light from the inner side of the reflector to the outer side thereof. While the figure illustrates a reflector formed of three plane surfaces intersecting in perpendicular relationship, the reflector may be parabolic or of any other desirable configuration.

Light which passes through side portion 56 of the reflector is directed through a light piping arrangement from the flashbulb to the window 79 covering the photoresponsive resistor 82. Element 82 forms a part of exposure control circuit illustrated diagrammatically at 84. Circuit 84 is a conventional trigger circuit and may be of the type disclosed in U.S. Patent No. 3,205,799, issued to Burgarella et al., Sept. 14, 1965. Forward cover section 26 of the housing 20 is provided with a recess 78 to accommodate window 79 which extends outwardly from the surface of lens and shutter housing 16 and an opening 80 through which pipe 76 may pass.

Means is provided to attenuate light piped from the flashbulb to the photoresponsive resistor in accordance with camera-to-subject distance. When the principal subject is near the camera a relatively large amount of light is passed from the photoflash bulb to the photoresponsive resistor in the exposure control circuit to decrease its resistance and thus effect a short exposure period. As the distance between the principal subject and the camera increases the amount of light allowed to pass from the flashbulb to the photoresponsive resistor is decreased to render the resistor less conductive and thus lengthen the exposure period. As previously mentioned, the magnitude of errors associated with exposures made with light of varying intensity is a function of the magnitude and rate of change in intensity. Hence, the error would be greater for exposures of subjects closer to the camera than for subjects at a greater range where the light from the flash is lower in intensity. The amount of attenuation provided by the present invention takes into account the variation in the magnitude of the errors, and adjusts the intensity of light incident on the photocell accordingly to provide an exposure time of optimum duration for a scene of average brightness at each camera-to-subject distance.

Embodiments shown in FIGS. 2 through 5 illustrate four methods by which the light allowed to pass from the flashbulb to the resistor may be variably attenuated.

In FIG. 2, support member 32, flashbulb 52, reflector 54 and light pipe 70 are fixedly positioned relative to camera body 14, and housing 20 and light pipe 76 are fixedly positioned relative to lens and shutter housing 16. Light pipe 70 directs light from the flashbulb through side 56 of reflector 54. Light pipe 76 directs light from pipe 70 to the photoresponsive resistor 82. As the camera is focused and lens and shutter housing 16 is moved relative to camera body 14 the light pipes 70 and 76 move relative to each other. The light pipes may be dimensionally equal in the direction transverse to their relative movement but member 76 is not as long as member 70 in the direction of the movement. The lower surface 211 of pipe 70 thus scans the upper surface 210 of pipe 76 as the relative movement occurs. Surface 211 is provided with light attenuating means, two examples of which are as shown in FIGS. 2a and 2b. FIG. 2a illustrates a light wedge relatively dense in portion 220 and decreasing in density toward portion 221. When the camera is focused for relatively near subjects, surface 211 of light pipe 70 is superimposed over portion 221 of surface 210, and as the camera is focused for subjects further away, surface 211 moves toward the more dense end 220 of surface 210. FIG. 2b illustrates an attenuator comprising a dark film or plate 230 having an opening encompassing a relatively large area at end 221 and progressively becoming smaller as it approaches end 220.

FIG. 3 shows an alternate embodiment wherein light pipes 70 and 76 have like cross sections. When the camera is focused on relatively near objects, the perimeter of surface 311 of light pipe 70 is superimposed over the perimeter of area 310 of light pipe 76, thus allowing maximum light to pass from the flashbulb to the photosensitive resistor. As the camera is focused on objects further away, the perimeter of light pipe 76 moves out of registration with that of light pipe 70, such that when the camera is focused on a subject at the furtherest extremity of its range only a minimum part of area 311 is superimposed over area 310. In this condition a minimum quantity of light from bulb 52 strikes the photosensitive resistor.

In the modification shown in FIG. 4, the housing 20, bulb 52, socket 36, reflector 54 and light pipe 76 are all fixedly positioned with respect to lens and shutter housing 16. Member 48, contact 50 and light wedge 70 are fixedly positioned with respect to the camera body 14. Light wedge 70 is of relatively light density at end portion 120 and becomes progressively more dense toward area 122. When the camera is focused on subjects relatively close to the camera, the lens and shutter housing 16 is positioned away from camera body 14, such that the less dense portion 120 of light wedge 70 is positioned between flashbulb 52 and light pipe 76. As the camera is focused on subjects approaching the far extreme of camera range, lens and shutter housing 16 together with housing 20, bulb 52 and bulb socket 36, reflector 54 and light pipe 76 move toward camera body 14, while light wedge 70 and member 48 remain fixed with respect to the camera body, such that the relatively dense portion 122 of light wedge 70 is positioned between the flashbulb and light pipe 76 which leads to the window 79 covering the photosensitive resistor. It is thus clear that when the camera is focused on subjects toward the farthest extreme of the flash range a minimum quantity of light passes from flashbulb 52 to the photosensitive resistor while a maximum quantity of light passes when the camera is focused on subjects relatively near the camera.

FIG. 5 illustrates a modification wherein the entire flash unit 10 is fixedly mounted on the lens and shutter housing 16. Adjustment of the light attenuating means 70 is manual. The light attenuating means may be a light wedge, an apertured plate, or any other suitable means. Rod 410 and handle 412 are operatively attached to the attenuator so that it may be positioned relative to light pipe 76. If desired, a scale of distances may be applied to rod 410 to facilitate proper adjustment of the attenuator in relation to camera-to-subject distance.

In the modifications shown in FIGS. 4 and 5, the reflector 54 is provided with an opening 64 which provides access to the inside thereof for light pipe 76 and attenuator 70.

In the above described embodiments the light pipe is illustrated as a rod of shaped plastic material capable of conducting light along a curved path but a mirror or prism arrangement could be used.

The subject of the present invention is not limited to use with cameras of the bellows type but may be adapted for a wide variety of cameras incorporating an exposure control circuit and photoconductive resistor, as illustrated by the schematic FIG. 6.

The shutter, not shown, and means to ignite flashbulb 452 are simultaneously actuated. As the shutter opens, bulb 452 ignites to light the subject. Reflector 454 directs most of the light to the subject but a portion is directed by prism 490 through a light conduit 494 to prism 492 which directs the light through opening 496 in the camera casing 400 to photoconductive resistor 498.

An attenuator 482, having a portion 484 to pass a relatively large quantity of light and a portion 486 to pass a relatively small quantity of light, is operatively associated with means 488 to lower attenuator 482 when the lens assembly 450 is moved outward from the camera casing to focus on near subjects, and to raise attenuator 482 when lens assembly 450 is moved inward to focus on far objects. An opening 480 in the camera casing wall provides room for element 488 to move. Any suitable means may be employed to render this opening lighttight.

Alternatively, the attenuator could be provided with means to manually position it in accordance with camera-to-subject distance. It is apparent from this illustration that the attenuator and the light-piping arrangement may be incorporated into the camera structure itself as well as into a camera attachment.

It should be further pointed out that the means to direct light from the flash unit to the photocell need not be limited to the particular means illustrated in the various embodiments but in any embodiment it may comprise a suitable means such as a Lucite tube, a system of prisms, or a system of mirrors.

It will be seen from the foregoing that the invention accomplishes its objects by providing a relatively simple and inexpensive construction which makes it possible to secure optimum flash exposures with a fully automatic shutter adapted for optimum exposures for photography when using uniform lighting.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photoflash unit for use with a photographic camera having an exposure aperture, a photoresponsive element, and exposure control means for regulating the amount of light admitted through said aperture during exposure as a function of the amount of light incident on said element, comprising:
    (a) means for supporting and energizing a photoflash lamp to illuminate a scene to be photographed;
    (b) light path means for directing a portion of the light from said lamp which is not incident on said scene onto said photoresponsive element; and
    (c) variable attenuating means for controlling said portion of the light from said lamp as a function of camera-to-subject distance.

2. The photoflash unit according to claim 1, further comprising:
(a) means for detachably mounting said photoflash element on said camera; and
(b) means on said photoflash unit to mask said photoresponsive element of said camera from light reflected from the scene being photographed.

3. The photoflash unit according to claim 1, wherein said light path means comprises means to reflect said portion of said light from said photoflash lamp to said photoresponsive element.

4. The invention according to claim 3, wherein said means to reflect said portion of said light from said photoflash lamp to said photoresponsive element comprises a plurality of mirrors.

5. The invention according to claim 3, wherein said means to reflect said portion of said light from said photoflash lamp to said photoresponsive element comprises a plurality of prisms.

6. The invention according to claim 1, wherein said variable attenuating means comprises:
(a) a sheet of translucent material of varying density; and
(b) means to adjustably position said sheet relative to said photoresponsive element and in the path of said portion of said light directed from said lamp to said photoresponsive element.

7. The invention according to claim 1, wherein said variable attenuating means comprises:
(a) an opaque plate interposed in said light path means and having an opening to permit the passage of light therethrough; and
(b) means to adjustably position said plate relative to said photoresponsive element so that said opening covers a variable amount of said element.

8. The invention according to claim 1, wherein said light path means comprises a solid, light-conducting medium arranged to direct said illumination from said photoflash unit to said photoresponsive element.

9. The invention according to claim 8, wherein said light-conducting medium comprises:
(a) a first rod having a first and second end;
(b) a second rod having a first and second end;
(c) said first end of said first rod being positioned to receive said portion of said light from said lamp and said second end of said first rod being positioned to direct said light to said first end of said second rod; and
(d) said first end of said second rod being positioned to receive said illumination from said second end of said first rod and said second end of said second rod being positioned to direct said illumination upon said photosensitive element.

10. The invention according to claim 9, wherein said variable attenuating means comprises:
(a) means to adjustably position said first rod laterally with respect to said second rod; and
(b) means to variably control the amount of light passing from said second end of said first rod to said first end of said second rod.

11. A photoflash unit for use with a photographic camera having an exposure aperture, a lens and shutter assembly, a body portion, and means to adjustably position said lens and shutter assembly relative to said body portion to focus said camera, a photoflash bulb and reflector assembly fixedly positioned relative to said lens and shutter assembly, an electrical circuit for controlling the time period during which said shutter is open in accordance with a variable circuit parameter and a photoresponsive element in said circuit having an electrical property variable as a function of the amount of illumination incident thereon and effective to establish said parameter, said element being fixedly mounted relative to said lens and shutter assembly which comprises:
(a) means fixedly mounted with respect to said lens and shutter assembly and arranged to conduct illumination directly from said bulb to said photoresponsive element;
(b) attenuating means effective to control the amount of illumination conducted from said photoflash bulb to said photoresponsive element to determine said parameter and thereby determine the amount of light admitted by said lens and shutter assembly, said attenuating means being fixedly positioned relative to said camera body; and
(c) means to totally mask said photoresponsive element from light from the scene being photographed.

12. The invention according to claim 11, wherein said attenuating means comprises:
(a) a sheet of translucent material of varying density; and
(b) means to adjustably position said sheet relative to said photoresponsive element and in the path of said illumination conducted directly from said bulb to said element.

13. The invention according to claim 11, wherein said attenuating means comprises:
(a) an opaque plate interposed in the path of said illumination and defining an opening to permit the passage of light therethrough; and
(b) means to adjustably position said plate relative to said photoresponsive element so that said opening covers a variable amount of said element.

14. The invention according to claim 11, wherein said means to conduct illumination comprises solid light-conducting medium adapted to receive light from said photoflash unit and to transmit said light from said photoflash unit to said photoresponsive element.

References Cited

UNITED STATES PATENTS

| | | | |
|---|---|---|---|
| 1,936,595 | 11/1933 | Goddard | 95—115 |
| 2,112,701 | 3/1938 | Leitz | 95—10 |
| 3,000,281 | 9/1961 | Rentschler | 95—10 |
| 3,072,028 | 1/1963 | Lange | 95—10 |
| 3,258,585 | 6/1966 | Crete | 240—1.3 |
| 3,278,738 | 10/1966 | Clark | 240—1 |
| 3,358,131 | 12/1967 | Bennett et al. | 240—1.3 |

NORTON ANSHER, *Primary Examiner.*

ROBERT A. SCHROEDER, *Assistant Examiner.*

U.S. Cl. X.R.

95—11